United States Patent [19]
Kitzner et al.

[11] 3,768,982
[45] Oct. 30, 1973

[54] CATALYTIC CONVERTER WITH ELECTRICALLY PREHEATED CATALYST

[75] Inventors: Ernest W. Kitzner, Allen Park; Alex Rhodes, Detroit; Moses Schachter, Oak Park, all of Mich.

[73] Assignee: Ford Motor Company, Dearborn, Mich.

[22] Filed: June 22, 1971

[21] Appl. No.: 155,550

[52] U.S. Cl. ............ 23/288 F, 60/300, 252/477 R, 423/212, 423/213, 423/214, 219/374, 219/375, 219/365, 23/288 J
[51] Int. Cl. ........................... B01j 9/04, F01n 3/14
[58] Field of Search ............... 23/288 J, 288 F, 23/2 E; 252/477 R; 60/300; 13/20; 219/374, 375, 365; 423/212–214

[56] References Cited
UNITED STATES PATENTS
| | | | |
|---|---|---|---|
| 654,467 | 7/1900 | Mactear | 13/20 |
| 3,507,627 | 4/1970 | Frant et al. | 23/288 F |
| 1,813,514 | 7/1931 | Schmidt et al. | 23/288 J |
| 3,441,381 | 4/1969 | Keith et al. | 23/288 F |

*Primary Examiner*—James H. Tayman, Jr.
*Attorney*—John R. Faulkner et al.

[57] ABSTRACT

Heat from an electric heater is transferred conductively through a monolithic support to a catalyst located on the surfaces of the monolithic support. Engine exhaust gases passing through the monolithic support contact the heated catalyst, which assists in converting undesirable components of the exhaust gases into less harmful components. Supplemental air is supplied to the exhaust gases from an annular distributing space located at the converter inlet.

1 Claim, 1 Drawing Figure

PATENTED OCT 30 1973 3,768,982
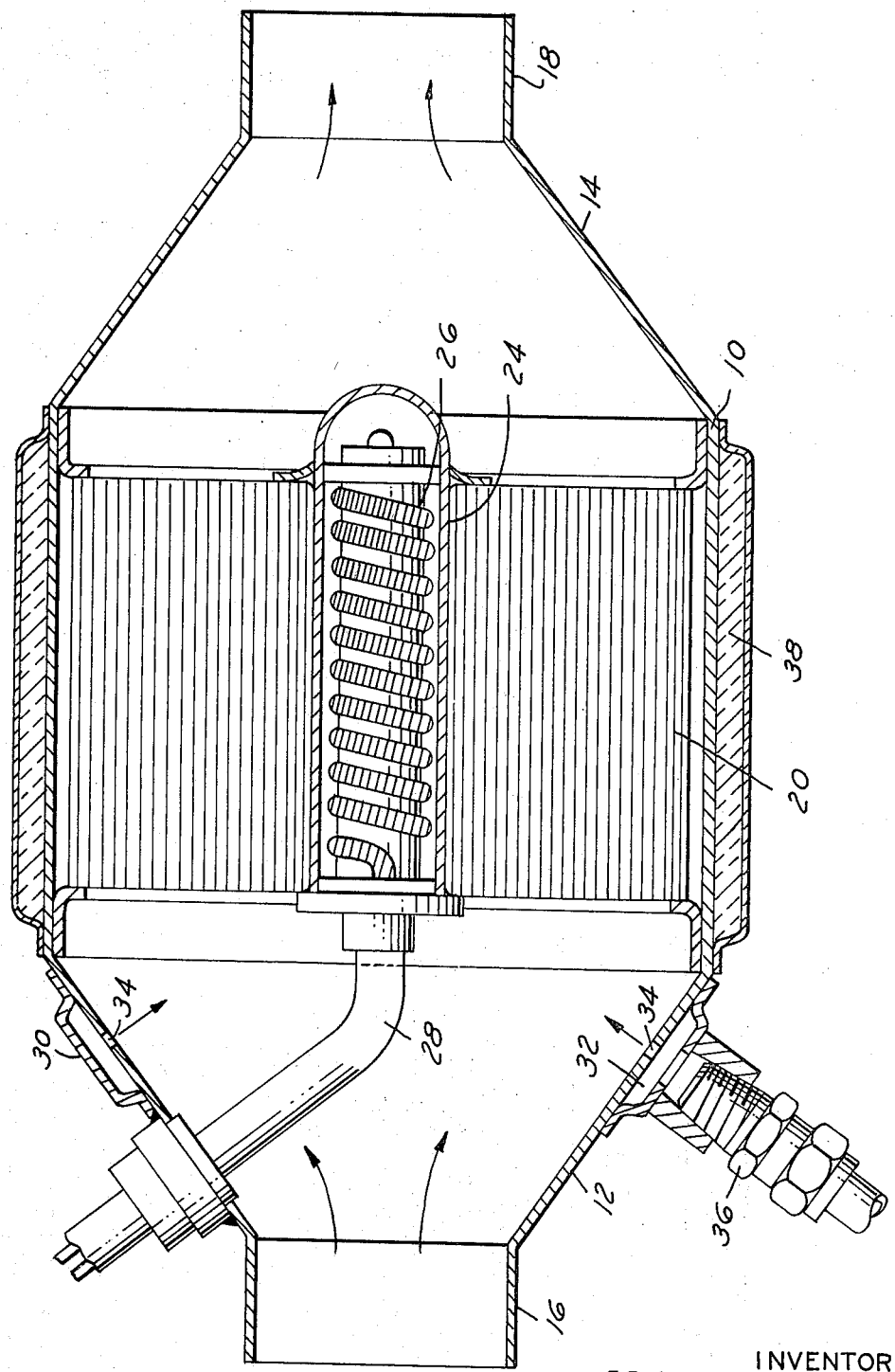
INVENTOR
ERNEST W. KITZNER
ALEX RHODES
BY MOSES SHACHTER
John R. Faulkner
Glenn S. Arendsen
ATTORNEYS

CATALYTIC CONVERTER WITH ELECTRICALLY PREHEATED CATALYST

SUMMARY OF THE INVENTION

Continually expanding anti-smog legislation is imposing increasing restrictions on the quantities of various undesirable components in the exhaust gases of automotive engines. The legislation has spurred development of suitable catalysts and catalytic converter constructions having an effective combination of cost, physical size and useful life for oxidizing undesirable components such as carbon monoxide and unburned hydrocarbons and reducing undesirable oxides of nitrogen.

Numerous improvements have been made to the carburetion, ignition timing, and other characteristics of the reciprocating engine itself to reduce the quantity of such undesirable components in the exhaust gases leaving its combustion chambers, but the wide range of operating modes and conditions demanded of the engines limits the overall effectiveness of such improvements. Certain proposed emission testing procedures specify including exhaust emissions during initial engine starting, in some cases under cold engine conditions. The engine needs an enriched fuel-air mixture during initial starting and the exhaust gases produced during such operation contain relatively high quantities of unburned hydrocarbons and carbon monoxide. When this characteristic is coupled to the fact that the presently available catalysts for converting such undesirables are ineffective at low temperatures, the impact of starting operations on overall vehicle emissions tested by such procedure becomes apparent.

Some prior art devices attempt to utilize electric heaters to heat the exhaust gases entering the converter and thereby initiate catalytic activity at an earlier time. Such heating systems require large amounts of electrical power and produce relatively minor improvements in overall converter operation.

Where prior art systems were directed primarily toward rapidly raising the exhaust gas temperature, this invention is based on the importance of heating the catalyst itself to a relatively high temperature. The device provided by the invention becomes effective usually within a few seconds after the engine is started, and it accomplishes this result by heating the catalyst itself to its effective temperature range without relying on the temperature of the exhaust gases to achieve such heating. Structural components of the device include a housing having an inlet for receiving exhaust gases from the engine and an outlet for permitting treated exhaust gases to leave the housing. A structural support locates a catalyst in the housing where the catalyst contacts at least a portion of the exhaust gases passing through the housing. An electrical heater is located in the housing so the structural support conductively transfers considerable amounts of heat from the heater to at least a portion of the catalyst.

When the automotive engine is started, the electrical heater is activated and the heat produced thereby is conducted rapidly to the catalyst, thereby raising the temperature of the catalyst to its effective temperature. Catalytic conversion begins and the exothermic conversion reactions provide additional heat that further improves catalyst efficiency and raises other portions of the catalyst to operating temperature. Usually by this time, the exhaust gases reaching the coverter also are at a temperature conducive to effective conversion. These multiple factors support and supplement each other to achieve high conversion efficiency shortly after the engine is started, thereby reducing considerably the overall quantity of undesirable components in the engine exhaust gases during the first few minutes of operation.

The catalyst preferably is distributed on the surfaces of a monolithic catalyst support that is highly porous to the exhaust gases. Such catalyst supports typically are made of ceramic materials having relatively high heat conductivity coefficients. Significant improvements can be achieved by making the catalyst supports of high temperature metal alloys such as stainless steels, nickel base alloys, etc. The catalyst support can have an elongated cylindrical shape that is porous to exhaust gases flowing substantially parallel to its axis. A tubular member essentially impervious to exhaust gases is located in the central portion of the catalyst support and a coiled electric heater is located within the tubular member. The tubular member is in intimate heat conducting contact with the catalyst support and heat transmitted to the tubular member from the heating element flows rapidly outward to the catalyst. Improved results are achieved by producing contact between the heater coils and the interior of the tubular member during heater operation.

Converters of this invention can be used either to reduce oxides of nitrogen in the exhaust gases or oxidize unburned hydrocarbons and carbon monoxide. The converter is more efficient when it is used in oxidizing reactions, since the additional air necessary for oxidation dilutes the heat content of the exhaust gases and thereby further delays the beginning of catalytic activity when only the exhaust gases are used to heat the catalyst. This effect of the additional air is minimized by conductively heating the catalyst as in the converter of this invention. The additional air is added conveniently from an annular air distributing space located in the inlet to the converter.

BRIEF DESCRIPTION OF THE DRAWING

The drawing is a sectioned elevation of a converter of this invention having a cylindrical catalyst support and a centrally located heater. An annular air distributing duct is included in the air inlet to the converter.

DETAILED DESCRIPTION

Referring to FIG. 1, the coverter device of this invention comprises a tubular housing 10 having a cone-shaped inlet 12 at one end and a cone-shaped outlet 14 at the other end. The smaller diameter of inlet 12 is connected to a tube 16 that delivers engine exhaust gases to the inlet. Similarly, the smaller opening of outlet 14 is connected to a tube 18 that transmits the treated exhaust gases away from the converter device.

A cylindrical monolithic catalyst support structure 20 is positioned within tubular housing 10. Support structure 20 has a plurality of small tubular passages running parallel to its axis and capable of conducting exhaust gases from inlet 12 to outlet 14. The surfaces of the passages contain finely divided catalyst suitable for converting undesirable components in the exhaust gases into less harmful components.

A tubular member 24 that preferably is made of a metal having high thermal conductivity is positioned in the center portion of support structure 20 and extends through the support structure as shown. Tubular member 24 typically is made of a nickel base alloy containing 13 percent chromium and about 6 percent iron and its exterior is in intimate heat conducting contact with the support structure. An electrical resistance wire heating element 26 is located within tubular member 24. Heating element 26 preferably is the coil type and its coils are connected to an appropriate source of electrical energy such as the vehicle battery (not shown). The leads from the element are located within an insulated conduit 28 that extends through the wall of inlet 12.

An annular member 30 having a hat-shaped cross section is fastened to the exterior of inlet 12 to define a space 32 with a portion of the wall of the inlet. A plurality of openings 34 are distributed around inlet 12 and the openings connect space 34 with the interior of the inlet. A tube 36 connects space 32 with an appropriate source of pressurized air. Insulation 38 can be applied to the exterior of the housing as desired to prevent undue heat losses during unusual or extended operation.

When the engine is started, a switch (not shown) connects the vehicle battery to electrical heating element 26. Heat from element 26 is radiated to tubular member 24 and then transferred by conduction through the walls of support structure 20 to the particles of catalyst on the surfaces of passages 22. Within a relatively few seconds, the catalyst immediately surrounding tubular member 24 rises to a temperature of about 500° C. at which point the catalyst is sufficiently active to perform its converting function.

Catalytic conversion begins and the heat from the exothermic conversion reaction combines with the heat from the heater to bring other portions of the catalyst into action. The temperature of the exhaust gases reaching the converter also increases in the meantime, so within a very short time all of the catalyst becomes active and overall converter operation reaches normal efficiency.

Supplemental air for use in an oxidation conversion can be supplied to air space 32 immediately upon starting the engine or a few seconds after the electric heater has begun warming the catalyst. Withholding the supplemental air for a few moments hastens catalyst warmup, but the slight improvement usually does not warrant the added cost of the necessary control equipment. Openings 34 can be arranged to distribute most of the supplemental air to the exhaust gases passing through the periphery of support structure 20; the supplemental air then does not interfere significantly with initial heating of the catalyst adjacent tubular member 24 because heat generated by the conversion reaction catalyzed by the catalyst adjacent the tubular member readily overcomes the cooling effect of the supplemental air.

After a few minutes of operation, heat from the conversion reaction and the warmed exhaust gases become sufficient to maintain the catalyst at an efficient operating temperature and the electrical energy being supplied to heating element 26 can be halted. Appropriate temperature sensing devices can be included to halt the flow of electrical energy to the heating element automatically.

Improved results are achieved by maintaining the heating coil in contact with the interior of tubular member 24 while electrical energy is being supplied to the heating coil. This can be accomplished without seriously complicating converter assembly by designing the coil and the tubular member so initial thermal expansion of the coil erases a small radial clearance that exists at room temperature.

Suitable catalysts useful in an oxidizing converter include platinum, palladium, copper oxide, cobalt oxide, nickel oxide, and numerous other elements and compositions. Several of these materials also catalyze nitrogen oxide reduction reactions.

Comparative tests of the converter of this invention with a similar converter lacking an electrical heater show reductions in carbon monoxide of almost 50 percent over a 3 minute test period. The heater was operated for the first 2 minutes of the test and its total electrical energy requirement was 40 watt hours. Considerable reductions of unburned hydrocarbons also were achieved.

Thus this invention provides a device that rapidly becomes effective in converting undesirable exhaust gas components after engine starting. Conductively transferring heat from an electric heater to the catalyst itself also reduces electrical energy requirements.

We claim:

1. A device for converting components of exhaust gases from an automotive engine into other components comprising:
    a cylindrical housing having a cone shaped inlet for receiving exhaust gases from the engine and an outlet for removing the exhaust gases from the housing; said cone shaped structure being fitted to the front of the cylindrical housing to form said inlet for the housing, said cone shaped inlet having its larger end connected to the cylindrical housing,
    a monolithic, cylindrical catalyst support fitted within the interior of the cylindrical housing and porous to exhaust gases flowing parallel to the support's central axis, the support having a cylindrical opening formed along the entire length of its central axis;
    a catalyst deposited on the surface of the catalyst support, the catalyst being active in converting components of the exhaust gases into other components,
    a heating structure located in the cylindrical opening of and extending along the entire length of the central axis of the support, the heating structure comprising a metal tubular member substantially impervious to exhaust gases and in intimate, heat contacting contact with the support, and an electrical heating element located within the tubular member, the heating element contacting the tubular member when electrical energy is supplied to the heating element; and
    a secondary air supply means for supplying secondary air to the exhaust gases passing through said cone shaped inlet, the secondary air supply means including: an annular member defining an annular space with said cone shaped member, the annular space communicating with the interior of said cone shaped member through a plurality of spaced openings and means for supplying secondary air to the annular space.

* * * * *